(12) United States Patent
Colnot

(10) Patent No.: US 12,314,796 B2
(45) Date of Patent: May 27, 2025

(54) CARD READER, SMART CARD AND METHOD FOR PROCESSING A TRANSACTION

(71) Applicant: Mastercard International Incorporated, New York, NY (US)

(72) Inventor: Cédric Colnot, Uccle (DE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/110,420

(22) PCT Filed: Jul. 20, 2021

(86) PCT No.: PCT/US2021/042321
§ 371 (c)(1),
(2) Date: Feb. 16, 2023

(87) PCT Pub. No.: WO2022/039867
PCT Pub. Date: Feb. 24, 2022

(65) Prior Publication Data
US 2025/0077805 A1    Mar. 6, 2025

(30) Foreign Application Priority Data
Aug. 17, 2020 (GB) .................................. 2012833

(51) Int. Cl.
*G06K 7/00* (2006.01)
*G06K 7/10* (2006.01)
*G06K 19/077* (2006.01)
(52) U.S. Cl.
CPC ....... *G06K 7/0004* (2013.01); *G06K 7/10356* (2013.01); *G06K 19/07769* (2013.01)

(58) Field of Classification Search
None
See application file for complete search history.

(56) References Cited

U.S. PATENT DOCUMENTS 6,327,578 B1   12/2001  Linehan
6,434,238 B1    8/2002  Chaum et al.
(Continued)

FOREIGN PATENT DOCUMENTS

CN    101192295 A    6/2008
DE    102011085537 A1    5/2013
(Continued)

OTHER PUBLICATIONS

PCT/US2021/042321 International Search Report and Written Opinion dated Nov. 11, 2021, pp. 1-11.
(Continued)

*Primary Examiner* — Kristy A Haupt
(74) *Attorney, Agent, or Firm* — Pramudji Law Group PLLC; Ari Pramudji

(57) ABSTRACT

A card reader (100) for reading a smart card (200), the card reader (100) comprising:
an antenna (160) for making a wireless connection with a smart card; and
a card detector, for determining a location of the smart card (200) relative to the antenna (160); and
wherein the card reader (100) has a processor (180) configured to provide communication with the smart card and to allow or provide a first wireless communication when the card (200) is determined to be at a first location (110) of the card reader and to provide a second wireless communication when the card is determined to be at a second, different, location (120) of the card reader (100).

15 Claims, 10 Drawing Sheets

(56) References Cited

U.S. PATENT DOCUMENTS

| | | |
|---|---|---|
| 7,027,773 B1 | 4/2006 | McMillin |
| 7,357,309 B2 | 4/2008 | Ghosh |
| 7,657,748 B2 | 2/2010 | Gentry |
| 8,720,771 B2 | 5/2014 | MacKinnon |
| 9,195,984 B1 | 11/2015 | Spector |
| 9,262,651 B2* | 2/2016 | Paulsen ............ G06K 19/07769 |
| 9,595,030 B2 | 3/2017 | Ekselius |
| 9,674,892 B1 | 6/2017 | Li |
| 9,741,036 B1 | 8/2017 | Grassadonia |
| 9,774,401 B1 | 9/2017 | Bornill |
| 10,496,856 B2 | 12/2019 | Palermo |
| RE47,894 E | 3/2020 | Wang |
| 10,706,400 B1 | 7/2020 | Puffer et al. |
| 10,721,274 B1 | 7/2020 | Prasad |
| 10,902,423 B2 | 1/2021 | Radu et al. |
| 10,963,871 B2 | 3/2021 | Safak et al. |
| 11,074,564 B2 | 7/2021 | Gurunathan et al. |
| 11,080,697 B2 | 8/2021 | Lakka et al. |
| 11,080,713 B2 | 8/2021 | Kohli |
| 11,093,938 B2 | 8/2021 | Parekh |
| 11,107,078 B2 | 8/2021 | Mariappan et al. |
| 11,157,896 B2 | 10/2021 | Nwokolo et al. |
| 11,301,865 B2 | 4/2022 | Tang |
| 11,544,781 B2 | 1/2023 | Dogin |
| 2004/0019571 A1 | 1/2004 | Hurwitz |
| 2006/0049258 A1 | 3/2006 | Pikivi |
| 2006/0219776 A1 | 10/2006 | Finn |
| 2006/0283960 A1 | 12/2006 | Top |
| 2007/0022058 A1 | 1/2007 | Labrou et al. |
| 2007/0125840 A1 | 6/2007 | Law et al. |
| 2008/0048036 A1 | 2/2008 | Matsumoto et al. |
| 2008/0071681 A1 | 3/2008 | Khalid |
| 2008/0208746 A1 | 8/2008 | Royyuru |
| 2009/0048971 A1 | 2/2009 | Hathaway et al. |
| 2009/0104888 A1 | 4/2009 | Cox |
| 2010/0033299 A1 | 2/2010 | Davis |
| 2011/0022521 A1 | 1/2011 | Collinge et al. |
| 2011/0178884 A1 | 7/2011 | Teicher et al. |
| 2011/0184867 A1 | 7/2011 | Varadarajan |
| 2011/0215159 A1 | 9/2011 | Jain |
| 2011/0238573 A1 | 9/2011 | Varadarajan |
| 2012/0036360 A1 | 2/2012 | Bassu et al. |
| 2012/0084836 A1 | 4/2012 | Mahaffey et al. |
| 2013/0212007 A1 | 8/2013 | Mattsson |
| 2013/0212025 A1 | 8/2013 | Tanner |
| 2013/0262296 A1 | 10/2013 | Thomas et al. |
| 2013/0297508 A1 | 11/2013 | Belamant |
| 2014/0138435 A1 | 5/2014 | Khalid |
| 2014/0189359 A1 | 7/2014 | Marien |
| 2014/0191031 A1 | 7/2014 | Paulsen |
| 2014/0258135 A1 | 9/2014 | Park et al. |
| 2014/0279556 A1 | 9/2014 | Priebatsch et al. |
| 2015/0032627 A1 | 1/2015 | Dill et al. |
| 2015/0032636 A1 | 1/2015 | Wedekind |
| 2015/0046339 A1 | 2/2015 | Wong |
| 2015/0112870 A1 | 4/2015 | Nagasundaram et al. |
| 2015/0137949 A1 | 5/2015 | Rofougaran et al. |
| 2015/0142673 A1 | 5/2015 | Nelsen et al. |
| 2015/0262180 A1 | 9/2015 | Hambleton |
| 2015/0269566 A1 | 9/2015 | Gaddam et al. |
| 2015/0294305 A1 | 10/2015 | Wang |
| 2015/0302390 A1 | 10/2015 | Huxham et al. |
| 2015/0310425 A1 | 10/2015 | Cacioppo |
| 2016/0065370 A1 | 3/2016 | Le Saint |
| 2016/0071095 A1 | 3/2016 | Foerster et al. |
| 2016/0117715 A1 | 4/2016 | Gross et al. |
| 2016/0217467 A1 | 7/2016 | Smets et al. |
| 2016/0224971 A1 | 8/2016 | Aabye |
| 2016/0307186 A1 | 10/2016 | Noe |
| 2017/0091758 A1 | 3/2017 | Kim et al. |
| 2017/0178090 A1 | 6/2017 | Sarin |
| 2017/0330181 A1 | 11/2017 | Ortiz |
| 2017/0330184 A1 | 11/2017 | Sabt |
| 2017/0344974 A1 | 11/2017 | Britt |
| 2018/0005231 A1 | 1/2018 | Grassadonia et al. |
| 2018/0047016 A1 | 2/2018 | Sarin |
| 2018/0232734 A1 | 8/2018 | Smets et al. |
| 2018/0349907 A1 | 12/2018 | Dixon |
| 2019/0026716 A1 | 1/2019 | Anbukkarasu |
| 2019/0034929 A1 | 1/2019 | Tang et al. |
| 2019/0066097 A1 | 2/2019 | Mackie |
| 2019/0108462 A1 | 4/2019 | Deloo |
| 2019/0075094 A1 | 5/2019 | Clarke |
| 2019/0147449 A1 | 5/2019 | Cole |
| 2019/0188696 A1 | 6/2019 | Carpenter et al. |
| 2019/0205575 A1* | 7/2019 | Gardiner ............ G06K 19/0718 |
| 2019/0213585 A1 | 7/2019 | Patni |
| 2019/0253434 A1 | 8/2019 | Biyani et al. |
| 2019/0318345 A1 | 10/2019 | Kallugudde |
| 2019/0362339 A1 | 11/2019 | Gurunathan et al. |
| 2019/0392411 A1 | 12/2019 | Jain et al. |
| 2020/0009454 A1 | 1/2020 | Kaiho et al. |
| 2020/0019961 A1 | 1/2020 | Silvestre |
| 2020/0027086 A1 | 1/2020 | Rao et al. |
| 2020/0160325 A1 | 5/2020 | Kim et al. |
| 2020/0219090 A1 | 7/2020 | Zarakas et al. |
| 2020/0265420 A1 | 8/2020 | Hamdan et al. |
| 2020/0302441 A1 | 9/2020 | Collinge et al. |
| 2020/0410483 A1 | 12/2020 | Dill et al. |
| 2021/0012322 A1 | 1/2021 | Manchanda |
| 2021/0065156 A1 | 3/2021 | Kadiwala et al. |
| 2021/0217005 A1 | 7/2021 | Mehrhoff et al. |
| 2021/0287211 A1 | 9/2021 | Aabye et al. |
| 2022/0051231 A1 | 2/2022 | Laracey |
| 2022/0122081 A1 | 4/2022 | Wagner et al. |

FOREIGN PATENT DOCUMENTS

| | | |
|---|---|---|
| EP | 0919945 A2 | 6/1999 |
| EP | 2189934 A2 | 5/2010 |
| EP | 2390817 A | 11/2011 |
| EP | 3618403 A1 | 3/2020 |
| JP | 2008129890 A | 6/2008 |
| JP | 2008-204248 A | 9/2008 |
| KR | 101236544 B1 | 3/2013 |
| KR | 10-2014-0008668 A | 1/2014 |
| KR | 101502460 B1 | 3/2015 |
| KR | 101679783 B1 | 11/2016 |
| KR | 2016-0140216 A | 12/2016 |
| KR | 20170058903 A | 5/2017 |
| WO | 1997046964 A1 | 12/1997 |
| WO | 2001-099070 A2 | 12/2001 |
| WO | 2003-038719 A1 | 5/2003 |
| WO | 2008-059465 A2 | 5/2008 |
| WO | 2020-243286 A | 6/2008 |
| WO | 2010-070539 A1 | 6/2010 |
| WO | 2010-099352 A1 | 9/2010 |
| WO | 2010-133096 A1 | 11/2010 |
| WO | 2013-050296 A1 | 4/2013 |
| WO | 2013155627 A1 | 10/2013 |
| WO | 2016-123309 A1 | 8/2016 |
| WO | 2016-161000 A1 | 10/2016 |
| WO | 2017007935 A1 | 1/2017 |
| WO | 2018-031856 A1 | 2/2018 |
| WO | 2019/136044 A1 | 7/2019 |
| WO | 2019-161003 A1 | 8/2019 |

OTHER PUBLICATIONS

GB 2012833.6 Search Report dated Jan. 27, 2021, pp. 1-2.
PCT International Search Report, Application No. PCT/GB2017/051818, dated Sep. 1, 2017, 2 pps.
EP Communication pursuant to Article 94(3) EPC; 19184252.5; Aug. 25, 2022, pp. 1-7.
EMV MasterCard Contactless Transaction Flow, EMV Level 2 Kernels, https://www.level2kernel.com/emv-mastercard-contactless-transaction.html, 2021, pp. 1-3.
EMV Overview—Elavon Developer Portal, https://developer.elavon.com/na/docs/viaconex/1.0.0/emv-integration-guide/3_emv_overview, 2022, pp. 1-33.
EMV, https://en.wikipedia.org/wiki/EMV, Wikipedia, Jan. 18, 2022 (last edited), pp. 1-26.

(56) References Cited

OTHER PUBLICATIONS

Tokenization (data security), https://en.wikipedia.org/wiki/Tokenization_(data_security), Wikipedia, Jan. 8, 2022 (last edited), pp. 1-8.
EMV Integrated Circuit Card Specifications for Payment Systems, Book 4 Cardholder, Attendant, and Acquirer Interface Requirements, Nov. 2011, pp. 1-154, EMC Version 4.3 Book 4.
A Guide to EMV Chip Technology, Nov. 2014, pp. 1-36, Version 2.0, EMVCo, LLC.
Field 55: ICC Data, Elavon Developer Portal, https://developer-eu.elavon.com/docs/eisop/field-descriptions/field-55-icc-data, 2021, pp. 1-11.
Terminal verification results, https://en.wikipedia.org/wiki/Terminal_verification_results, Wikipedia, Dec. 12, 2021 (last edited), pp. 1-3.
Smart card application protocol data unit, https://en.wikipedia.org/wiki/Smart_card_application_protocol_data_unit, Wikipedia, Aug. 24, 2021 (last edited), pp. 1-3.
O. Ogundele, et al.; "The Implementation of a Full EMV Smartcard for a Point-of-Sale Transaction," World Congress on Internet Security (WorldCIS-2012), Guelph, ON, Canada, 2012, pp. 28-35.
PCT/SG2022/050327 Search Report and Written Opinion dated Dec. 23, 2022, pp. 1-20.
EMVco Payment Account Reference (PAR): A Primer, Version 1.1, Secure Technology Alliance, Apr. 30, 2018, pp. 1-20.
PCT/US2022/049771 International Search Report and Written Opinion dated Mar. 20, 2023, pp. 1-19.
PCT International Search Report and Written Opinion; PCT/US2020/040206; Oct. 21, 2020.
PCT International Search Report and Written Opinion; PCT/US2021/047077; Dec. 14, 2021.
PCT/US2021/018344 International Search Report and Written Opinion dated May 27, 2021, pp. 1-11.
EP 20159634.3 Extended European Search Report dated Jul. 30, 2020, pp. 1-8.
PCT International Search Report and Written Opinion; PCT/US2020/039521; Oct. 14, 2020.
EPO Office Action; EP 19187159.9; Jun. 8, 2021.
EPO Search report; EP 19187159.9; Apr. 17, 2020.
Yingjiu, et al.; A Security-Enhanced One-Time Payment Scheme for Credit Card; 14th International Workshop on Research Issues on Data Engineering; Web Services for E-Commerce and E-Government Applications (RIDE'04); IEEE; 2004.
EPO Oral Summons; EP 19187159.9; Jul. 29, 2022.
EP Search Report; EP 21858781.4; Jul. 12, 2024.
SG10202204968V Written Opinion dated Jan. 23, 2025, pp. 1-26.

* cited by examiner

CARD READER, SMART CARD AND METHOD FOR PROCESSING A TRANSACTION

CROSS REFERENCE TO RELATED APPLICATION

This application claims the benefit of United Kingdom Patent Application No. 2012833.6 filed on Aug. 17, 2020, the contents of which provisional application are hereby incorporated by reference for all purposes.

TECHNICAL FIELD

The present disclosure relates to a card reader, for example a point of sale device, a smart card, for example a payment smart card, and a method for processing a transaction.

BACKGROUND

Smart cards are cards that comprise an integrated circuit, allowing them to hold information and engage in communication with external systems. Contactless smart cards communicate with card readers using radio based communication whereas contact cards have electrical contacts to form an electrical contact with corresponding contacts of a card reader in order to communicate. Dual function smart cards (i.e. smart cards having both contact and contactless mechanisms) comprise components to allow them to operate using either interface. A dual-function smart card must also have a kernel and applications stored within it to enact contact transactions and contactless transactions.

Payment cards (such as credit and debit cards) are commonly dual function smart cards. This allows a cardholder (i.e. a user of the card) to interact with a payment terminal via either of the interfaces. Typically historically, the contactless interface is used for low value transactions and does not require any extra cardholder authentication. The contact interface is typically historically used for higher value transactions and requires cardholder authentication (such as provision of a Personal Identification Number (PIN)). The contact interface is also known to be used for verifying a biometric template, when used to authenticate the cardholder, and authorising changes security or financial details relating to the cards, such as for changing security information (e.g. the PIN and biometric template) or loading card balance. These transactions often require a longer interaction, either because multiple steps are taken as part of the transaction, or in that more data may be transferred from the terminal to the card or vice versa.

Normally the card allows a cardholder to perform operations on their bank account—for example transfer money, allow a remote bank account server to cause a balance for the account to be displayed at a terminal, change a password stored/authenticated at a remote account server. It is not common to allow changes to information stored on the card itself. The card can be thought of as a key that allows either off-card processes to take place (or not if the card is not present).

Dual-function smart cards and card readers are, by necessity, more expensive and more complex than their single function counterparts as they must contain the necessary components to encompass both functions.

STATEMENTS OF INVENTION

One aspect of the invention provides a card reader for reading a smart card. The card reader comprises an antenna for making a wireless connection with a smart card, and a card detector, for determining a location of the smart card relative to the antenna. The card reader is configured to communicate with the smart card and to allow or provide a first wireless communication when the card is determined to be at a first location of the card reader and to provide a second different wireless communication when the card is determined to be at a second, different, location of the card reader.

Providing a different communication may comprise selecting one communication to provide to or from the card from two or more communications. It is often going to be the case that the different communications will have different functions or characteristics and may require different levels of security.

Smart cards are cards for controlling access to resources (for example financial, data or locations) which possess an integrated circuit. In particular, smart cards in the context of this specification primarily relate to smart cards for performing financial transactions-such as credit or debit cards.

The card reader may comprise a first communication zone. The first communication zone may comprise a card receiving and holding station, adapted to receive a card and hold it in place, possibly without a cardholder holding the card in place, and possibly without anyone touching the card. The first communication zone may comprise a pseudo-contact card-dipping station.

The card reader may comprise a second communication zone. The second communication zone may comprise a card contactless station.

The first and second locations of the card reader may comprise the first and second communication zones.

The card contactless station may be a region of a housing of the card reader where transactions may be carried out in that region through a cardholder "tapping" a card on the card reader in that location, or otherwise approaching the card contactless station with a card. The card contactless station may have an indication to a user that a card should be brought into the vicinity of the reader at that location. Transactions may be carried out without an actual physical tap; rather the card may be brought proximal to the card reader in the vicinity of the card contactless station, for example hovering at the contactless station. Of course, the user could touch the card contactless station with the card: it will still work.

The card detector may be configured to determine whether the smart card is within the first communication zone or the second communication zone, and to enable/disable certain functionality or operations that can be performed between the card and the card reader depending upon where the card is located.

The card reader (or a processor of the card reader or in communication with the card reader) may be looking to see if the card has started communicating via the antenna at the first or second communication zone. A card detector may be provided to enable it to be determined whether the card is in the first or second communication zone. For example, if the card reader is expecting a card to be dipped into the first communication zone, the card detector at that zone may tell the card reader that the card is present, and that information may be used to trigger the pseudo-contact mode.

The first and second communication zones may be arranged on opposite sides of the antenna. The first communication zone may be underneath the antenna when the card reader is in use. The second communication zone may be above the antenna when the card reader is in use. The second communication zone may instead encompass any region (or even the entire region) around the antenna except a region defined by the first communication zone. The first and second communication zones may be arranged on the same side of the antenna.

The card detector may be configured to detect whether the smart card is in the first communication zone or not.

The card reader may determine that the smart card is in the second communication zone. It may do this by determining if the antenna can connect to the smart card and the card detector does not detect the smart card in the first communication zone.

The card detector may comprise a switch which generates a signal to a control processor when switched. The switch may also or instead activate a signal emitter of the card reader. The signal emitter is located in the first communication zone and is configured to provide a signal from which the smart card can determine that it is in the first communication zone. The signal emitter may be a light signal emitter, such as an LED, and may be configured to provide a specific wavelength of light. The signal emitter may be instead a magnetic field, for example a constant magnetic field generated by a small permanent magnet or an activated coil. The signal emitter may instead be an electrical contact, configured to make a connection with a corresponding electrical contact of the card.

If an electrical contact signal emitter is provided to enable the card to determine (itself determine) that it is in the first communication zone, that is not the same as a prior art contact card reader. The electrical contact signal emitter does not power the card or read/write card identity or security or financially related data to or from the card, and instead provides a logic state (0 or 1) to indicate to the card that the card is in the first communication zone (or not).

The switch is triggered by insertion of a card into the card receiving and holding station.

The switch could detect when a card is partly in the card holding and receiving station (sometimes considered a dipping zone), for example as it is beginning to be inserted, or it could detect whether the card is fully inserted into the card receiving and holding station, or it could do both. The card reader may make preparations to communicate in pseudo-contact mode when the card is detected as being partly in position but not actually make the communication with the card until the card confirms it supports the pseudo-contact mode. The card itself may determine that it is in the card holding and receiving station before to confirm it supports the pseudo-contact mode. The card reader may abandon the communication if it doesn't receive the confirmation that the card supports the pseudo-contact mode within a given timeout.

In one embodiment, the card will not start to communicate with the reader unless there is enough coverage or coupling with the antenna. When the signal is strong enough (before the card is fully slid home in the pseudo-contact slot for example) the card and card reader begin to communicate. However, only when the card has detected that it is fully inserted will it accept/authorise the operation of activities reserved for the pseudo-contact mode of communication.

The switch may consist of a mechanical switch (such as a micro switch or a tactile switch) or an optical switch. The switch may be provided at the aperture of a card-dipping slot in the card reader.

The card itself may have a sensor, for example a light sensor, to determine whether the card is in the dipping zone/card holding and receiving station.

Other sensor types (such as an electrical contact or a magnetic sensor) may be used. Any sensor that is operable to allow the card to detect that it is inserted in the dipping zone may be suitable.

The card reader (and/or the card itself) may be configured to provide communications of longer duration between the card reader and the smart card when the card is in the first communication zone (e.g. dipping zone) than when it is in the second communication zone (e.g. tapping zone).

Communications of longer duration provide for transfer of larger packages of data, and/or more complex series of human-machine interactions that can take longer to complete.

The data transfers in the first communication zone may last longer than 300 ms. Preferably the data transfers in the first communication zone last longer than 1 second.

The data transfers in the second communication zone may last less than 50 ms. Preferably the data transfers in the first communication zone last less than 300 ms.

Communications requiring longer durations may include one or more of at least: verifying a PIN, verifying a fingerprint, changing a PIN, updating data on the smart card, updating applications on the smart card, or updating security settings (for example changing keys).

Communications requiring larger data transfers may include one or more of at least: sending cardholder data (e.g. biometric data) to or from the smart card, updating card applications and sending or receiving other larger packages of data.

The card receiving and holding station may be configured to hold the card in a fixed position relative to the antenna, possibly without the user holding the card.

The card reader may have multiple antennae, but in some preferred embodiments the card reader may comprise no more than one antenna for communicating with a smart card. In other words, the card reader may comprise only a single antenna capable of communicating with a smart card, wherein the single antenna is operable to communicate with a smart card in two different modes.

Another aspect of the invention provides a card reader for reading a smart card. The card reader comprises an antenna for making a wireless connection with a smart card, a first communication zone, comprising a card receiving and holding station, and a second communication zone, comprising a card tapping or approaching station. The antenna is configured to communicate with a smart card provided at either the first communication zone or the second communication zone. The communication acts permitted by the cardholder of the card via the card reader differ depending on which zone the card is provided at.

Another aspect of the invention provides a smart card for use with the card readers of the preceding aspects.

Another aspect of the invention provides a smart card. The smart card is configured to receive a signal from a card reader, determine which one of a number of different wireless communication positions relative to the card reader the card is positioned at, using the received signal, determine a wireless communication in dependence on the determined position or received signal, and provide or receive the wireless communication to or from the card reader.

This enables a smart card to permit certain functions/operations/interactions with the reader only when it has itself determined that it is in a specific position relative to the card reader. This may be achieved by the card having a logic processor capable of making such a determination and authorizing particular functionality when it determines that it is in the right position.

The smart card of either of the preceding aspects may comprise a memory containing a first set of instructions and a second set of instructions, wherein the first set of instructions provides a first communication and the second set of instructions provides a second communication. The first set of instructions may comprise the second set (that is to say all instructions may be enabled/authorised at the first location and only a part of the instructions at the second location relative to the card reader).

The smart card may comprise a sensor for receiving the signal from the card reader.

The sensor may comprise a light sensor, or a magnetic sensor, or an electrical contact.

Another aspect of the invention provides a method of processing a transaction. The method comprises determining the location of a smart card relative to an antenna of a card reader; and providing a first wireless communication if the card is determined to be at a first location, or providing a second wireless communication if the card is determined to be at a second location.

In many embodiments, it is the card that determines which of the first or second wireless communications to make.

It will be appreciated that the first and second communicators may enable different card reader interactions.

Another aspect of the invention provides a data processing apparatus/device/system comprising a processor configured to perform the method of the preceding aspect.

Another aspect of the invention provides a computer program comprising instructions which, when the program is executed by a computer, cause the computer to carry out the method of the above aspect.

Another aspect of the invention provides a non-transitory computer-readable storage medium comprising instructions which, when executed by a computer, cause the computer to carry out the method of the above aspect.

Another aspect of the invention provides a payment card comprising a wireless emitter and receiver (transceiver) and a processor, the processor being adapted to receive information relating to the position of the card relative to a card reader when a data transfer between the reader and the card is to be performed, and adapted to enable or disable the performance of specific actions available to a cardholder depending upon the location of the card.

The processor on the card may be adapted to receive a signal from, or derived from, a card-position sensor associated with a card reader, and to use that signal to enable the card to perform particular interactions with the card reader.

The card itself may have a sensor adapted to sense when the card is in a card reader slot and which is in communication with the processor, the processor being configured to enable at least one specific action available to the cardholder only when it receive a signal from the sensor indicating that the card is in the card reader slot.

Another aspect of the invention provides a method of reducing the costs of manufacturing payment cards having a contactless communication capability and a contact communication capability. The method comprises not including a true contact infrastructure in the card, and instead having a processor or chip which is configured to determine whether the card is in a card reading slot of a card reader and use wireless communications with the card reader to perform restricted card reader interactions permitted only when the card is in the slot, so as to provide pseudo-contact capability.

Another aspect of the invention provides a method of reducing the costs of manufacturing payment card readers having a contactless communication capability and a contact communication capability. The method comprises not including a true contact infrastructure in the card reader, and instead having a processor or chip which is configured to determine whether a payment card is in a card reading slot of the card reader and use wireless communications with the card to perform restricted card reader interactions permitted only when the card is in the slot, so as to provide pseudo-contact capability.

BRIEF DESCRIPTION OF THE DRAWINGS

A description of the invention will now be described, by way of example only, with reference to the accompanying drawings, in which.

DETAILED DESCRIPTION

Figure 1:
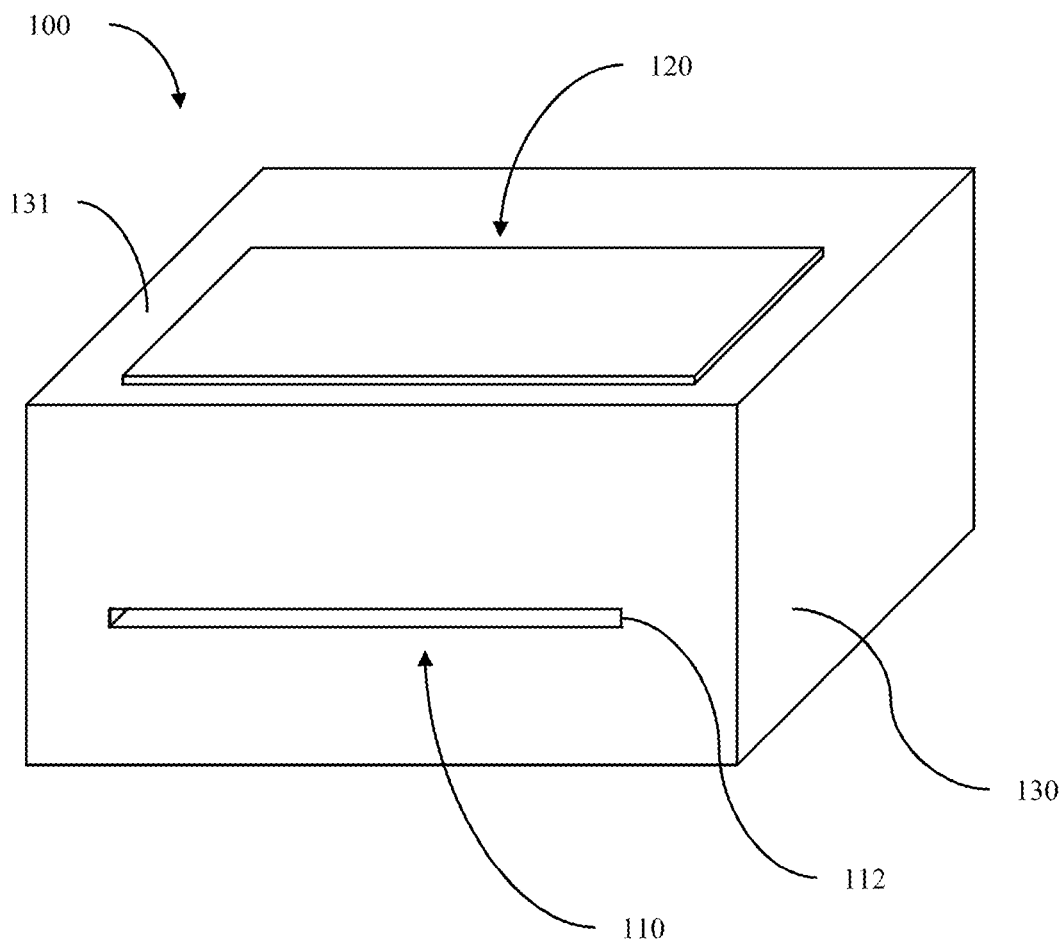
FIG. 1 shows an oblique schematic view of a card reader.

FIG. 1 shows a card reader 100 (otherwise known as a "payment terminal" or "point of sale device") for communication with a smart card. The card reader 100 is shown in an in-use orientation, in which a front of the device is facing the viewer and the top of the device is orientated towards the top of the page.

The card reader 100 comprises a housing 130 and two communication zones. A first communication zone 110 is constructed to superficially resemble card reading zones of conventional contact card readers. The first communication zone comprises a card receiving and holding station in the form of a slot, having an opening 112 in the housing 130 through which a card may be at least partially inserted. The opening 112 is formed in the front surface of the device. A second communication zone 120 is provided externally to the housing. The second communication zone 120 is situated on and proximal to a surface 131 of the housing 130. The surface could be any surface, but in this example the surface is the top surface 131 of the housing. Using the top surface 131 as the second communication zone further enforces the visual similarity and cardholder perception of functionality between the card reader 100 and card readers known in the art. The communication zones 110, 120 are regions in which a smart card may be placed in order to communicate with the card reader 100. The content of the communication is dependent upon which communication zone the smart card is placed in, as described in more detail below. Depending upon which communication zone is used the smart card permits some operations and not others; some interactions with the card are reserved for taking place only when the card is in a selected specified zone.

Figure 2:
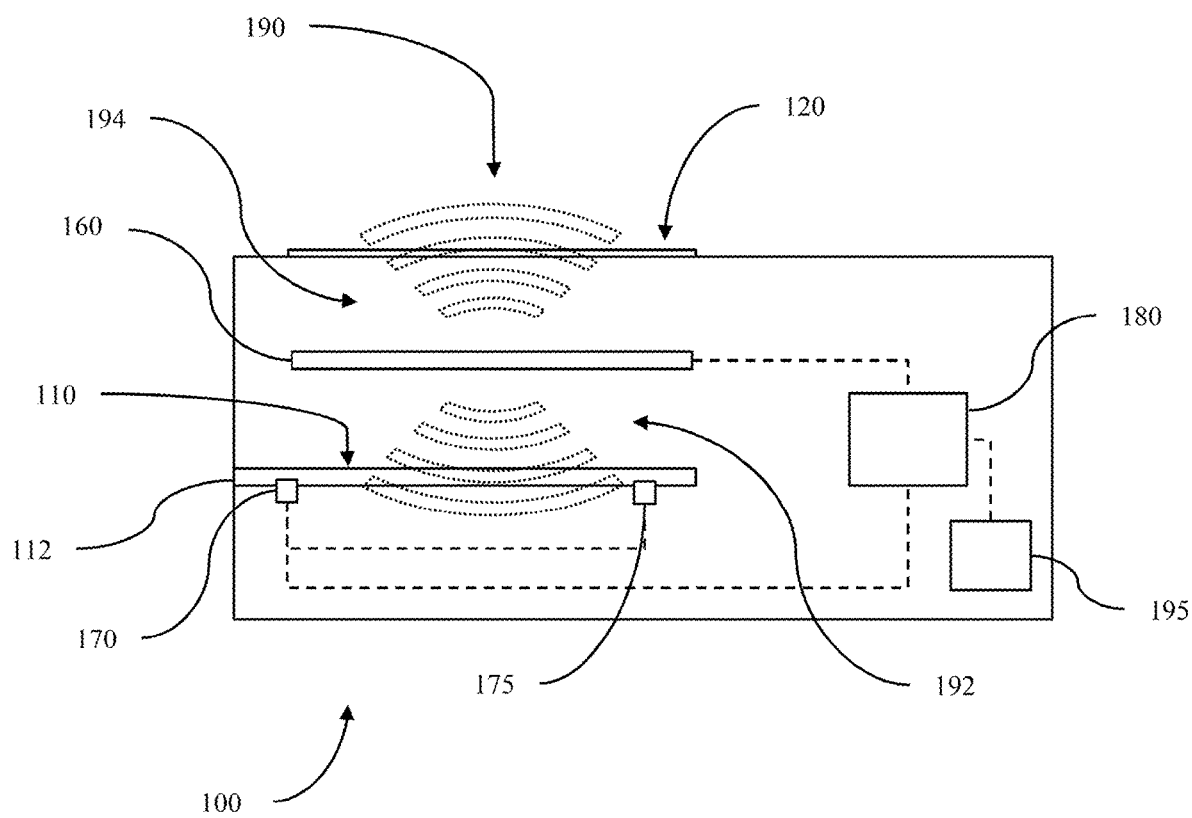
FIG. 2 shows a simplified sectional view of the card reader of FIG. 1.

A simplified cross section of the card reader 100 is shown in FIG. 2. The card reader 100 comprises a single card communicator 160. The communicator is an antenna 160 that functions as a wireless emitter/receiver/transceiver. This is different to conventional, dual interface, card readers which possess a pair of card communicators, one for contact transactions (e.g. chip and pin) with electrical contacts and one for contactless transactions with an antenna. The antenna 160 is similar in geometry and size and thickness to a card, and is arranged so as to provide a communication field 190 that encompasses both the first and second communication zones 110, 120, so that a card can be read and/or written to wirelessly/in a contactless manner whichever zone it is in. The first and second communication zones are arranged such that they are on different sides of the antenna. The first communication zone 110 is situated below the antenna and the second communication zone 120 is situated above the antenna 160. The field 190 has a first region 192 below the antenna and a second region 194 above the antenna.

A card detector 170 is provided within the first communication zone 110. The card detector in this example consists of a switch 170. In this example the switch 170 is a mechanical switch, but any switch that may be triggered by insertion of a card into the card reader may be suitable, for example, an optical switch. The switch 170 is triggered when a card is inserted into the slot. The switch 170 is in communication with a processor 180, to which it provides a signal indicating the presence (or lack of presence) of a card in the slot. This switch is also in communication with a signal emitter 175. The signal emitter 175 is configured to provide a signal to the card 200 in order that the card 200 can determine that it is within the first communication zone. The signal emitter is provided as an LED configured to emit a light for detection by the card 200. Other light sources may be used. The light is provided over a specific range of wavelengths (for example ultra violet). In other examples other signal emitters may be used, for example a permanent magnet or a magnetic coil generating a constant magnetic field in the card reader detected by a magnetic field sensor in the card, or an electrical contact, configured to make an electrical connection with a corresponding electrical contact on the card 200. The electrical contact is not as complex as the contacts used in contact smart cards, which are used for transferring data, but rather consists in this example of a single pin contact to simply provide a signal indicative of insertion of the card into the slot (or of the presence of the card in the slot) to the card 200. The processor 180 is also in communication with the antenna 160. The processor 180 is configured to execute instructions in order to provide the antenna with data for communication with the smart card and similarly to receive data from the smart card. In some examples the card detector 170 may not be in direct communication or any communication with the processor 180. Rather the card detector 170 simply triggers the signal emitter 175 by closing a circuit, without any processing requirements. In still further examples a card detector 170 is not provided and instead the signal emitter 175 exists in an 'always on' state provided the card reader is powered.

A software-processing kernel of the processor 180 of the card reader is configured to provide operation in two modes. A first mode is used if it is determined that a smart card is in the first communication zone. If a card is determined to be within the communication field 190 and the card detector 170 detects the presence of a card then a determination that the card is in the first communication zone 110 is made. If a card is in the communication field but the card detector 170 does not detect a card, then it is determined that the smart card is in the second communication zone 120. The second mode is used if a card is determined to be in the second communication zone.

The card reader 100 provides a single antenna through which a connection can be established with a smart card whilst still appearing to the cardholder to provide a dual-function card. Conventional card readers require distinct different infrastructure for each function. The card reader 100 is therefore simpler and cheaper to construct than conventional card readers. Also, prior art cards require contact points for contact reading/writing, and also wireless transceivers. A card with only a wireless transceiver and no contact structure is less expensive to make. Not having a complex contact structure also allows the card to have a slimmer profile and be of lighter construction, and therefore reducing storage requirements in a cardholder's wallet or purse. Another useful feature is that the pseudo-contact card reader slot 112 can accommodate cards of different thicknesses, which is not the case with true contact card reader slots. This gives the opportunity to card manufacturers to provide thinner and lighter cards.

Only a single kernel is also required to be hosted in the processor 180. The single kernel is operable to define the different use cases and modes of operation. This further simplifies the operation of the processor. Newer cryptographic evolutions on contactless smart card will soon also make contactless transactions more secure than contact transactions. Only using the contactless interface therefore improves the security of transactions. The card reader 100 emulates the function of conventional card readers so as to provide cardholder with a process of carrying out a transaction to which they are already accustomed. This maintains cardholder confidence in the security of transactions and also negates the need for cardholder training.

If we consider legacy support for existing cards, the card reader will support contactless interactions with existing contactless cards (contactless only or dual interface), but will not support true contact interactions with legacy cards (contact only or dual interface). In some embodiments, the card may still have a contact interface to interact with existing true contact interface card readers, whilst also having the capacity to interact wirelessly with pseudo-contact interface card reader.

The card reader also comprises a connector 195 that provides a connection to a network. The connector 195 is in the form of a Wi-Fi® antenna, but other connectors may be used, such as over other wireless connections (e.g. Bluetooth®) or through a wired connection. Information may be provided from the network (and/or a memory or a computing device also connected to the network) to the card reader 100. The card reader 100 is configured to operate online or offline (i.e. connected or disconnected to the network) in order to enact transactions.

Figure 3:
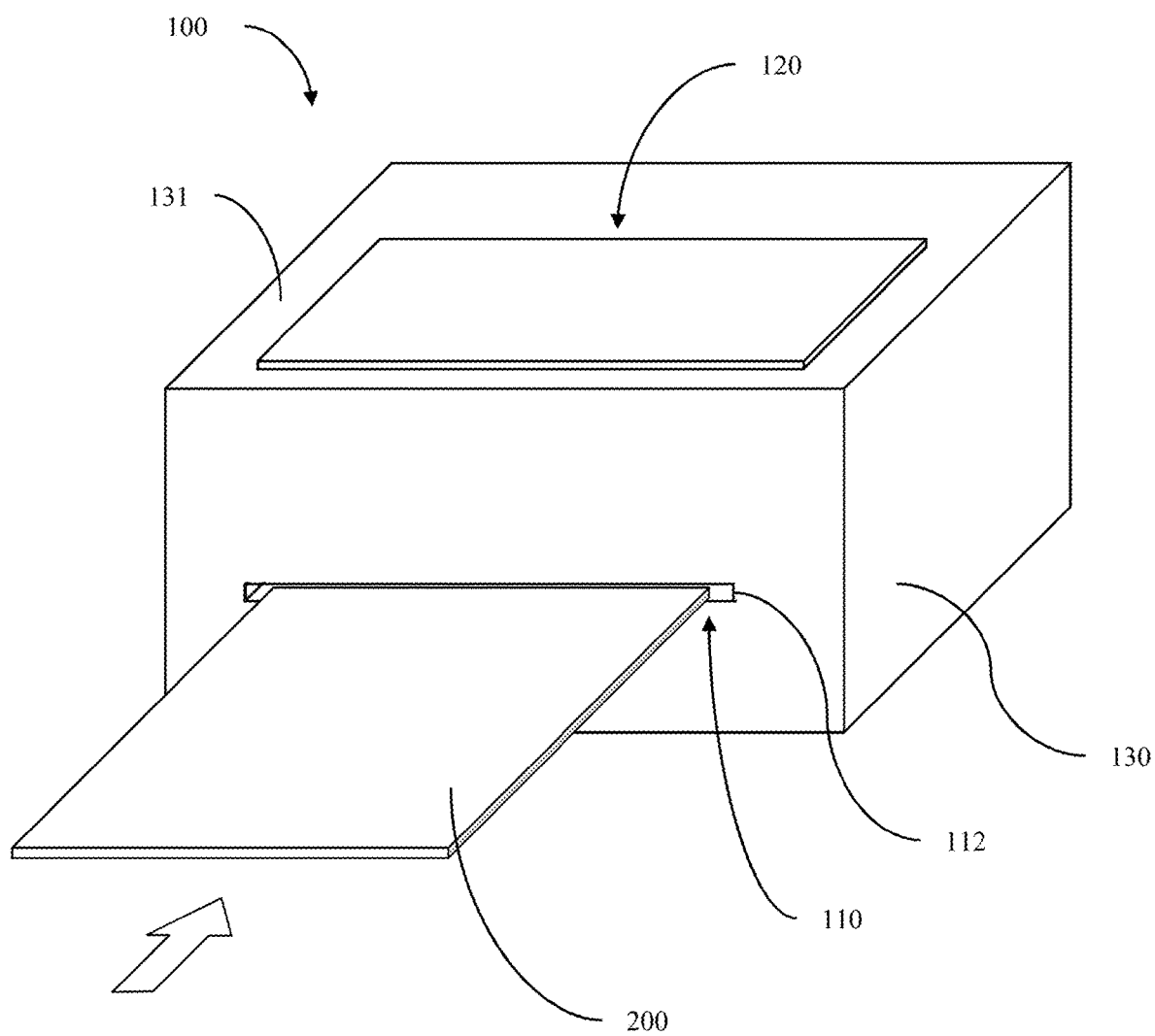
FIG. 3 shows an oblique schematic view of a smart card being used in a first manner with the card reader of FIG. 1.

FIG. 3 shows a smart card 200 being inserted into the slot associated with the first communication zone 110. The cardholder interaction with the card reader 100 is configured to be similar or even the same as the "dipping" interaction with a conventional chip and pin card reader, despite the differing mechanisms. This may include requiring further authentication before subsequent transaction/acts are allowed. The further authentication might be the input of a Personal Identification Number, a thumb print scanner or other biometric data or any other cardholder authentication means. As the card is inserted into the slot it enters the first communication zone 110 and the communication field 190, and communicates with the processor 180 via the wireless connection, using the first region 192 of the field 190 that is below (to one side) of the antenna 160.

Figure 4:
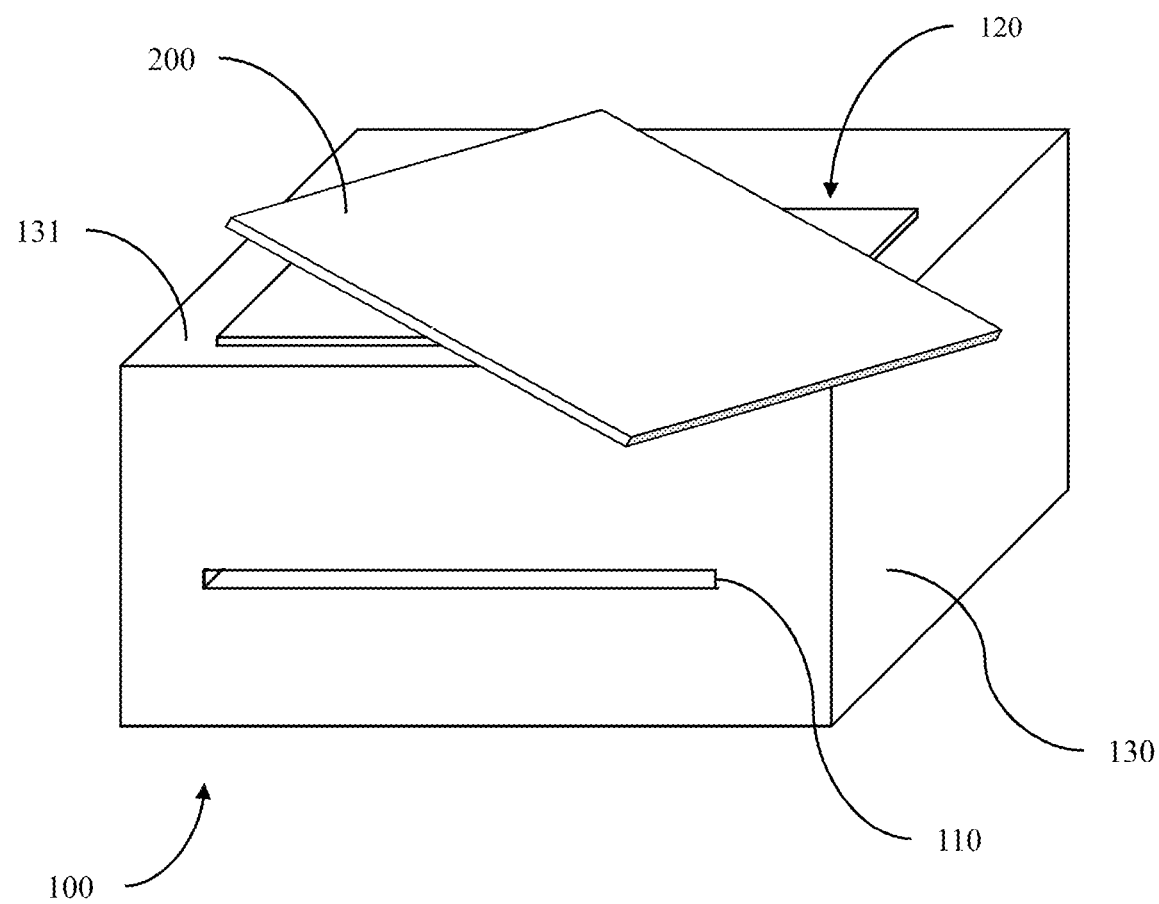
FIG. 4 shows an oblique schematic view of a smart card being used in a second manner with the card reader of FIG. 1.

FIG. 4 shows a smart card being placed in the second communication zone 120. The cardholder interaction with the card reader is configured to be similar or even the same as the "tap" interaction with a conventional contactless card reader despite the differing mechanisms. The card 200 communicates with the reader 100 using the second region 194 of the field 190 that is above (to the other side) of the antenna 160.

Figure 5:
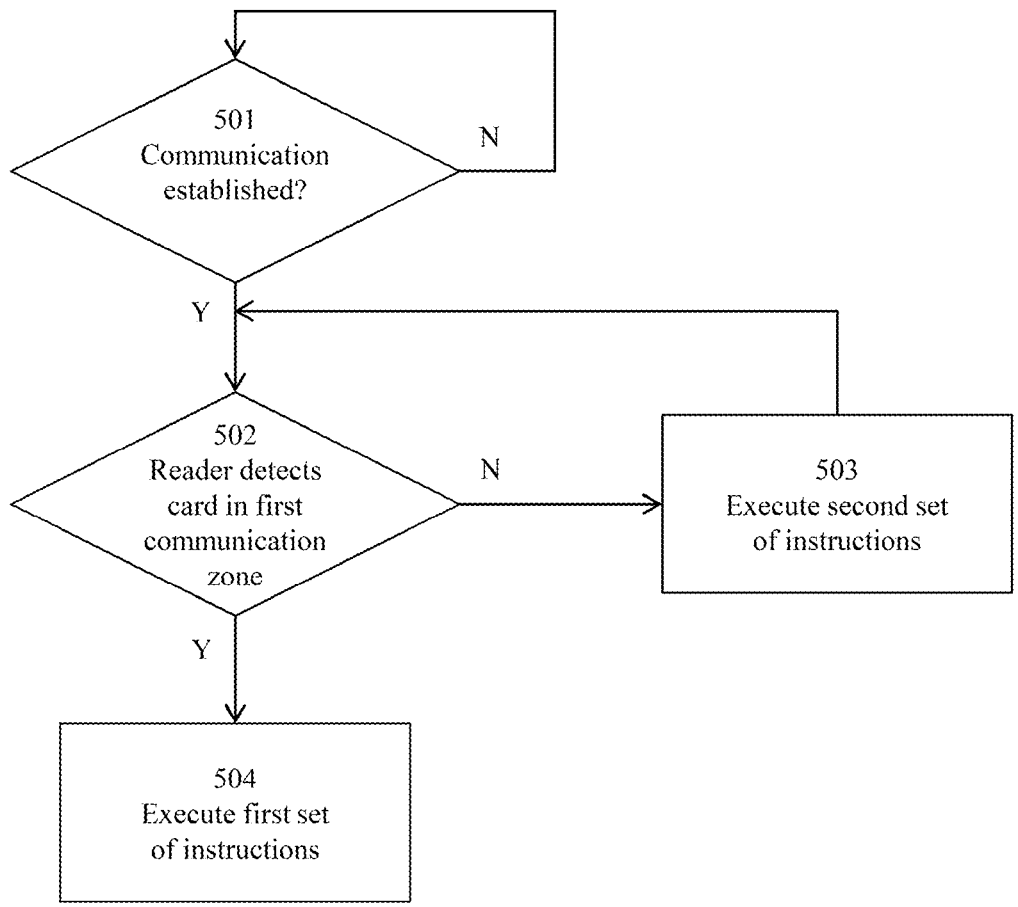
FIG. 5 shows a process flow for using a smart card with a card reader.

FIG. 5 shows a process flow for a method of enacting a transaction using a smart card and a card reader.

At a first step 501 a determination is made as to whether a card has established a communication with a card reader. If not then the process resets. If yes then the process moves to a second step 502 in order to determine whether the card is in a first communication zone or a second communication zone. If the card is determined to be in the first communication zone then the process moves to a third step 503. If the card is not determined to be in the first communication zone then the card is instead determined to be in the second communication zone and the process moves to a fourth step 504. The third and fourth steps 503, 504 comprise executing a first or second set of instructions respectively. The first set of instructions provides the steps for enacting a communication between the card and the card reader when the card is in the first communication zone. The second set of instructions provides the steps for enacting a communication between the card and the card reader when the card is in the second communication zone. The first and second sets of instructions are comprised within a single kernel hosted on the card reader and/or within a single kernel hosted on the card. When executing the second set of instructions the card may be determined to be in the first communication zone then the process moves to step 503.

The second step 502 comprises the card (itself) detecting a signal provided from the card reader. The signal is only detectable when the card is physically inserted into the card reader, requiring alignment of corresponding components of the card and card reader or close proximity (wherein close proximity is considered to be between contact and 5 mm). This prevents the card from determining that it is inserted in the dipping zone of a card reader, as described in the invention, and performing restricted card reader interactions when in fact the card is still in the cardholder wallet or purse.

The card itself has enough processing capability on it to receive a signal indicative of the card being in the correct place in an allowed card reader and permitting on itself appropriate processing to enable restricted card reader interactions to take place, or to send an enable signal to the card reader enabling the card reader to perform restricted card reader interactions.

Figure 6:
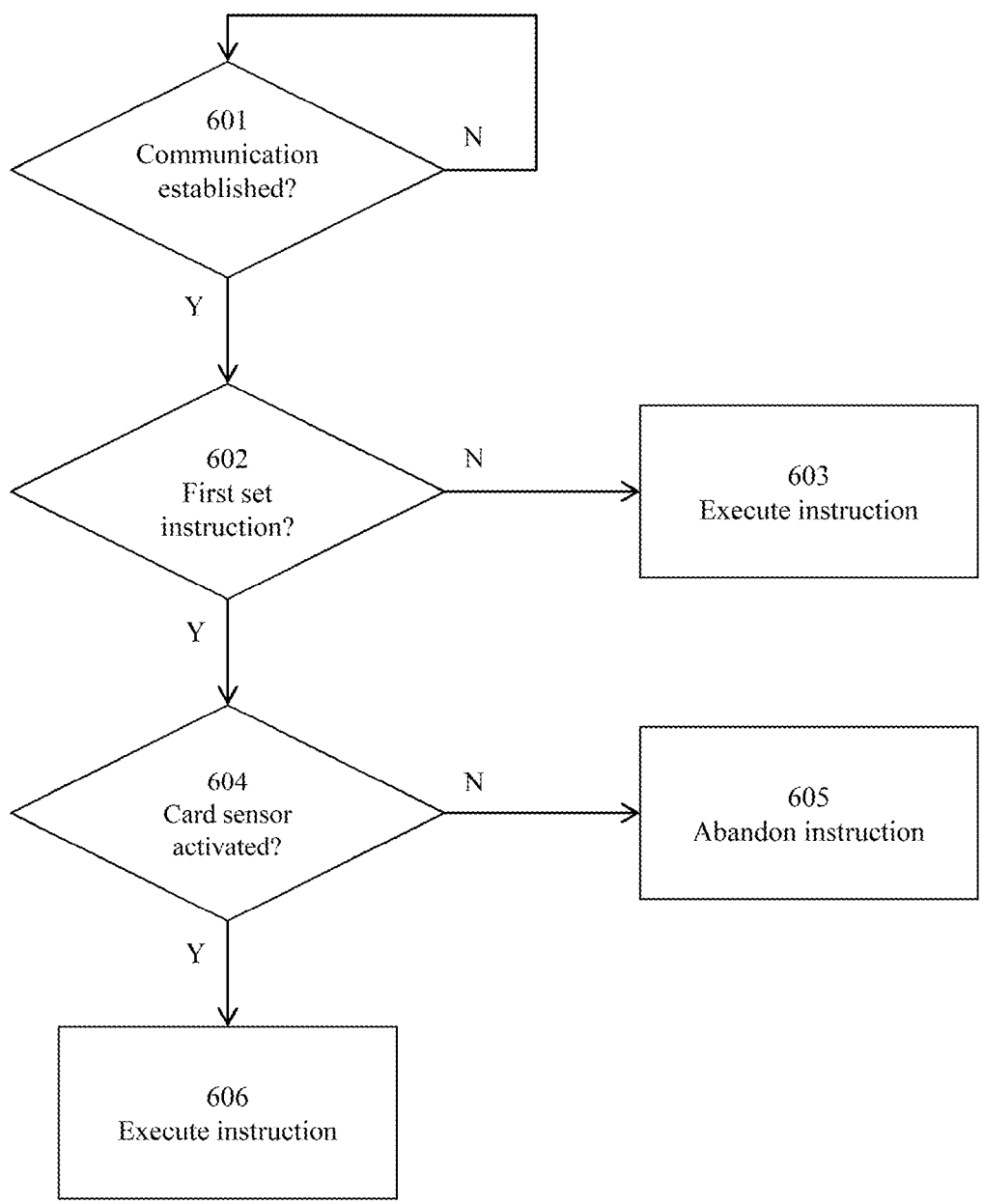
FIG. 6 shows a subsequent process flow for using a smart card according to examples of the invention with a card reader according to examples of the invention following the steps of FIG. 5.
Figure 7:
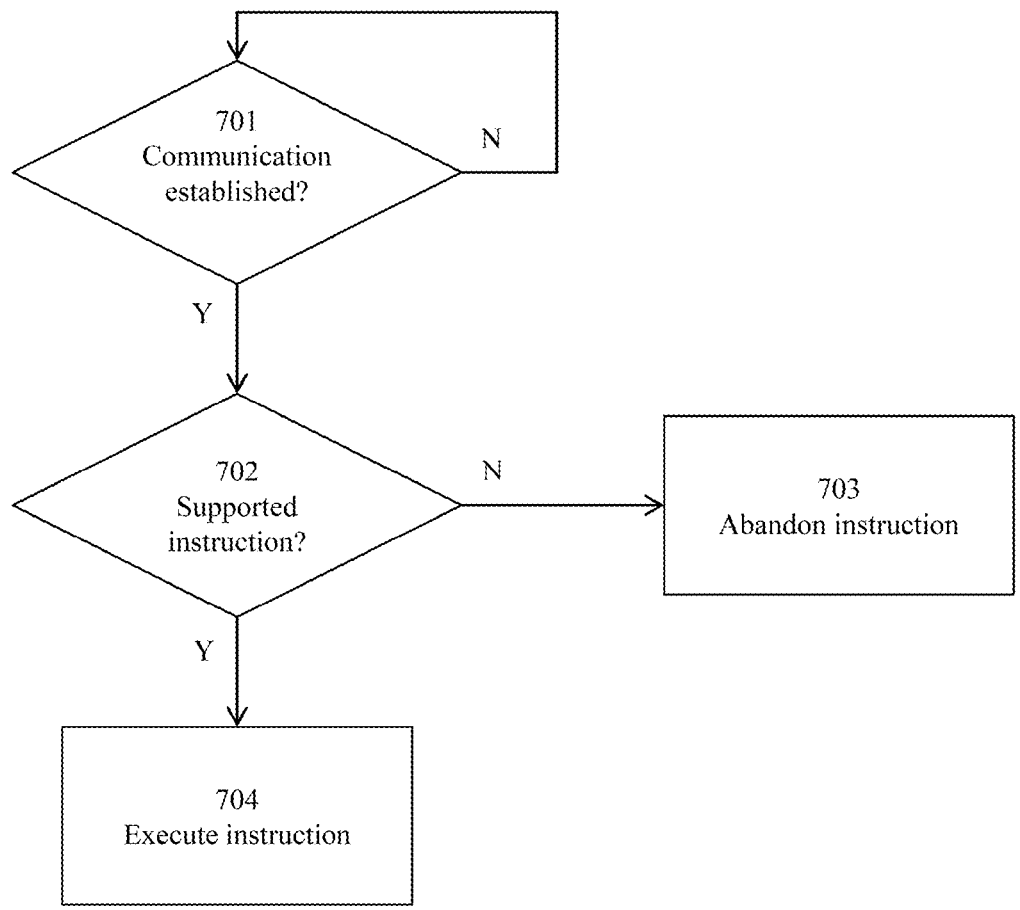
FIG. 7 shows another subsequent process flow for using a legacy smart card with a card reader according to examples of the invention following the steps of FIG. 5.

The steps flowing from the activation of the first or second set of instructions are shown in FIGS. 6 and 7 respectively.

In FIG. 6 the card has established the communication with the card reader has been determined by the card reader to be in the first communication zone and therefore the first set of instructions is executed. As the card is in the first communication zone it is held stationary relative to the antenna, thereby providing a more stable connection than if the card was not held stationary. Typically, cardholders push the card into the slot 112 and let go of it there, leaving it held in the reader 100. This allows for communications that are longer in duration and therefore can comprise larger amounts of data transfer. The connection established in step 501 allows a communication between the card and the card reader at step 601. The communication defines the nature of the transaction to be carried out. Transactions to be carried out which may require longer durations in order to process or transfer larger amounts of data transfer or to have a series of human-machine interactions are likely to be more sensitive in nature, for example updating details on the card or changing a PIN. The transactions may take longer than 300 ms, or even longer than 1 second.

The instruction is received in a first step 601. In a second step 602 a determination is made as to whether the instruction is of the first set of instructions. If the instruction is not of the first set then it is automatically determined that it is therefore of the second set of instructions and can therefore be executed in a third step 603. If the instructions are indeed of the first set then the process moves instead to a fourth step 604. In the fourth step 604 a determination is made as to whether the card sensor is activated. If the card sensor is not activated then the instruction is abandoned in a fifth step 605. Abandoning the instruction provides a security measure against unwarranted transactions. If the card sensor is activated then the process instead moves to a sixth step 606 of executing the instructions. As the card sensor is activated then the security measures of confirming the card is in the reader is met and more sensitive transactions can therefore be carried out.

In FIG. 7 a legacy card is instead used with the card reader. As with FIG. 6, the first step 701 comprises the card receiving instructions. A determination is then made at a second step 702 as to whether the instruction is a supported instruction. The legacy card will still be able to carry out legacy contactless functions, such as low value payments, and so some functions may be available. If the instruction is not supported then the process moves to a third step 703 and the instruction is abandoned. If the instruction is supported then the process instead moves to a fourth step 704 and the instruction is executed.

In both of the processes of FIGS. 6 and 7 a confirmation that the transaction was carried out successfully may also be provided to the cardholder, to a financial services provider, or both. Similarly a failed transaction notification may also be provided should the transaction be unsuccessful.

Figure 8:
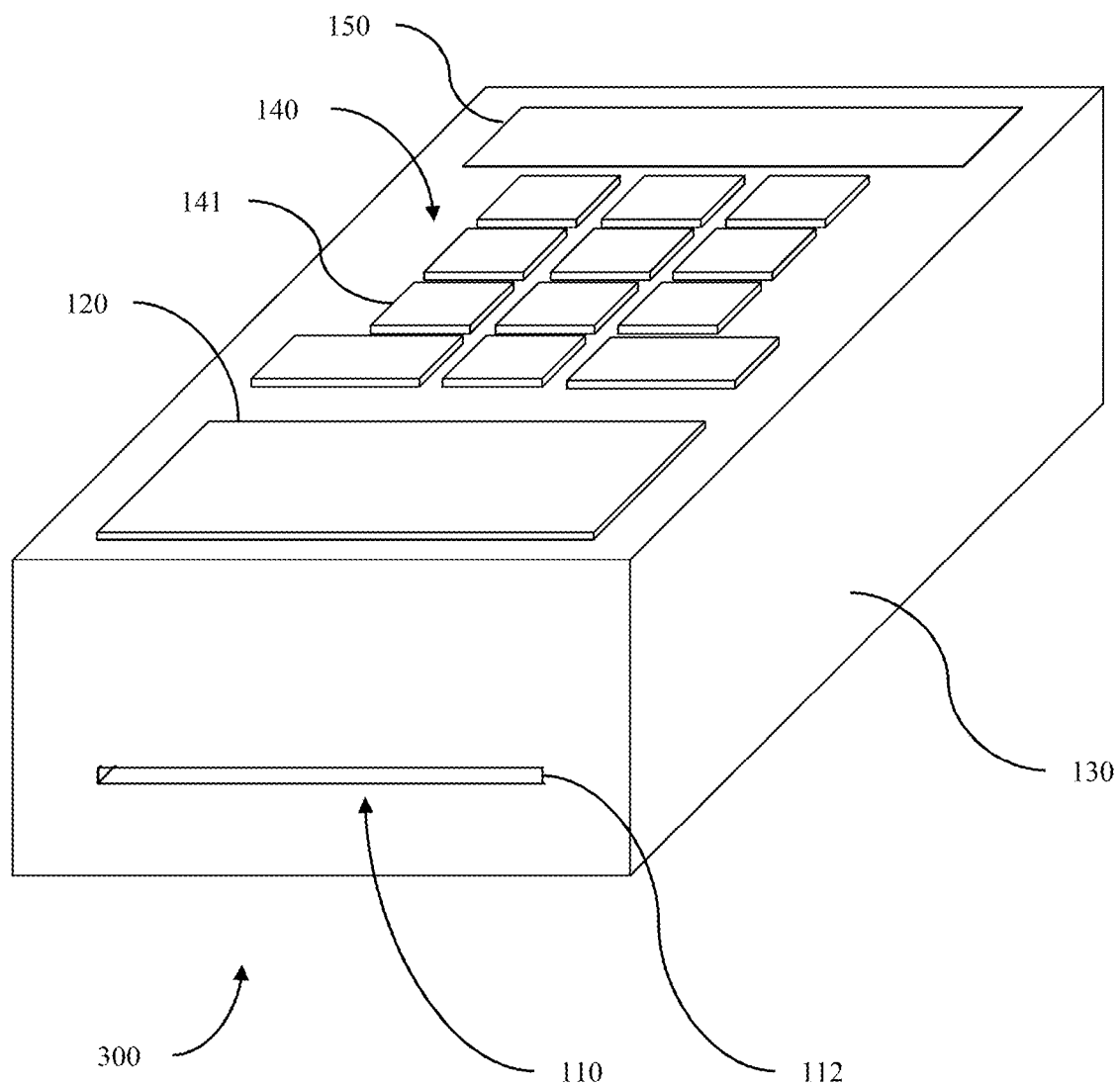
FIG. 8 shows an oblique schematic view of a further card reader.

FIG. 8 shows a further example of a card reader 300. The card reader 300 is similar in construction to the previous card reader 100, having a housing 130, a first communication zone 110, and a second communication zone 120. The card reader 300 further comprises a keypad 140. The keypad 140 allows a cardholder or vendor to input data. The input data may be in response to queries or requests displayed on a display 150 of the card reader 300, such as a request for a PIN. The keypad 140 comprises physical keys 141 in this example. Other examples of card readers 300 may instead use touch screens, computer peripherals, or any other suitable keypad by which a cardholder may interact with the card reader 300.

Figure 9:
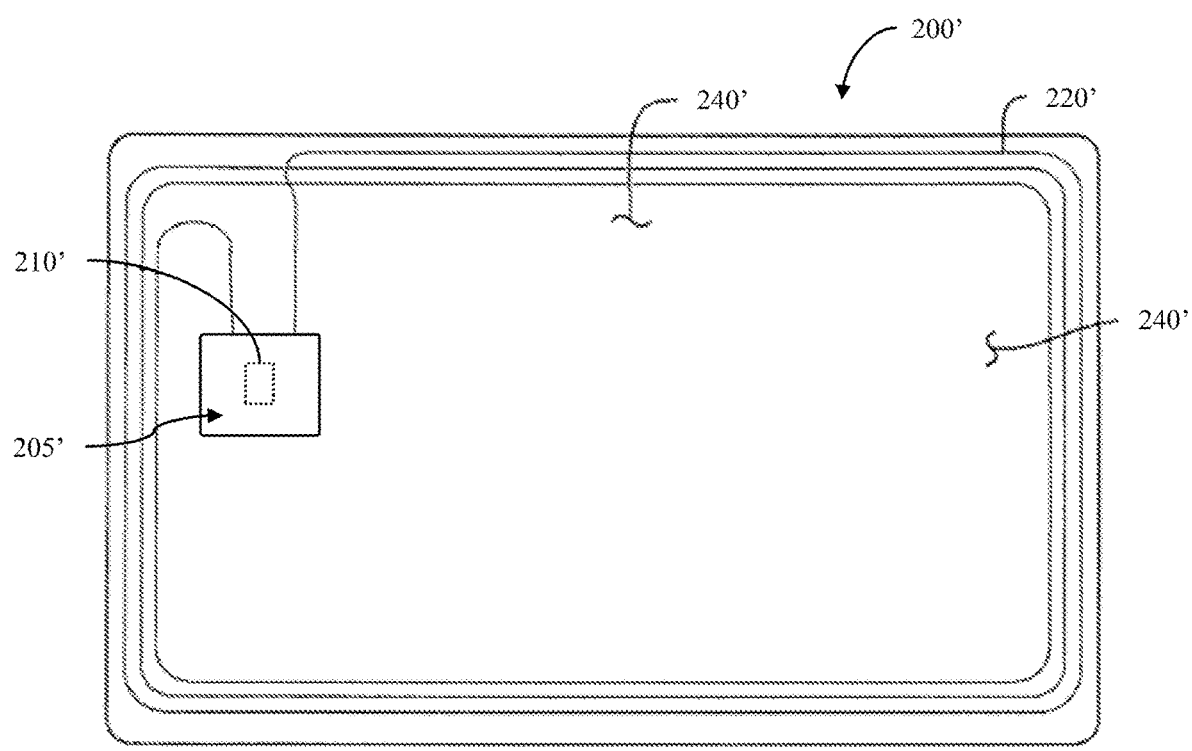
FIG. 9 shows a sectional schematic view of a legacy contactless/dual interface smart card.

FIG. 9 shows a prior art legacy smart card 200' having a chip 210', a wireless antenna 220' for wireless communication with a card reader, and a module 205' supporting the chip 210' with electrical contacts for contact communication between a card reader with electrical contacts and the card. The card has a surface 202' that is opaque.

If the card 200' is used in the card reader of FIG. 1-4 or 8, it can communicate wirelessly via its antenna 220'. Whether it is in the first or second communication zone the card communicates wirelessly. No contact communication takes place via the contact 205' because the card reader has no matching contacts.

Figure 10:
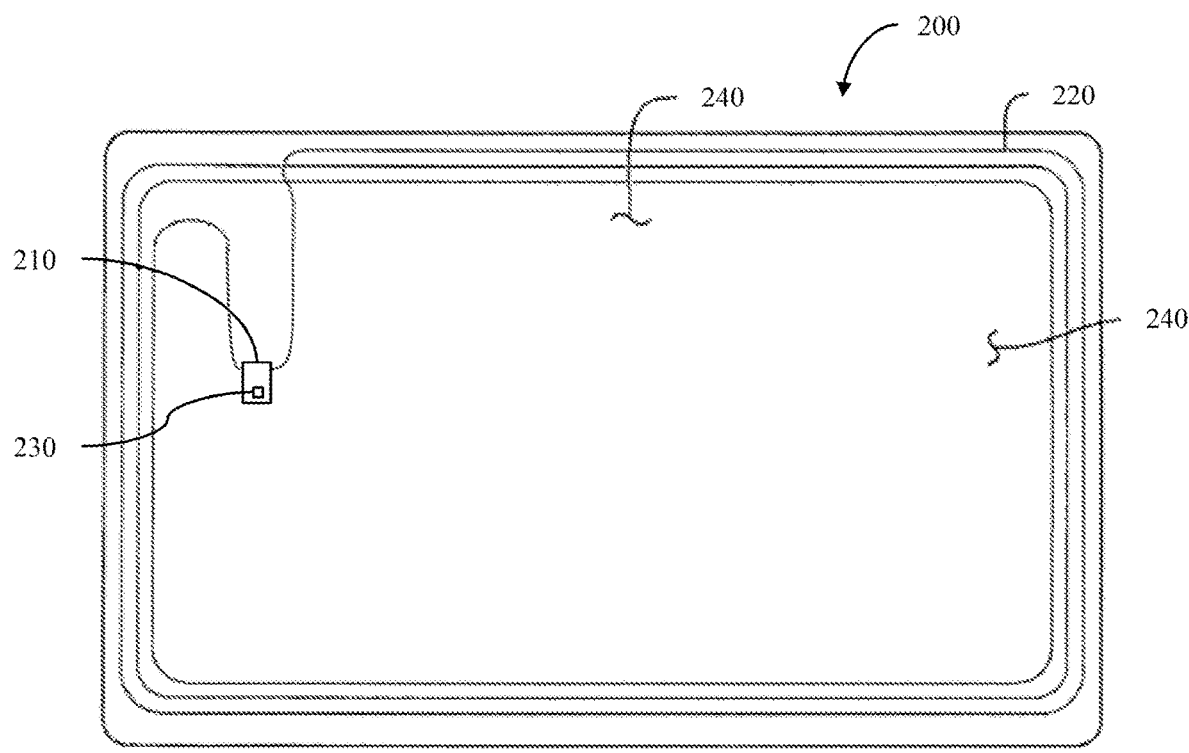
FIG. 10 shows a sectional schematic view of a contactless smart card according to examples of the invention.

FIG. 10 shows a smart card 200 in accordance with the invention. The smart card is in the main of conventional construction for contactless smart cards and is configured for use with the example card readers described above at least.

The smart card comprises a chip 210 which is configured to store information relating to the associated bank account and the cardholder of the smart card. The chip 210 also stores instructions for communicating with a card reader in either a first mode or a second mode (i.e. with a first communication or a second communication). The first mode provides operation of the card 200 in a pseudo-contact scenario and the second mode provides operation of the card 200 in a contactless scenario. A main antenna 220 is provided in the card in order to provide a means by which the card can be powered by and communicate with the card reader. The antenna 220 is connected to the chip 210 and is configured to transmit and receive data in dependence upon the operation of the card.

The chip 210 is configured to determine whether it is in the first communication zone 110 or the second communication zone 120. As shown in FIG. 10, the chip comprises a sensor 230 that may be configured to receive a signal directly from the signal emitter 175 when the card is inserted into the slot 110.

The sensor 230 in one example is a light sensor, configured to sense a light emitted by the card reader within the slot. The light sensor 230 may be in the form of an electronic circuit with a photoelectric diode attuned to a specific frequency-such as ultraviolet (UV) or infrared (IR)—of which the card reader is configured to provide (with an LED for example). A portion of the surface 240 of the card covering the light sensor is translucent or transparent in order to allow the ingress of light to the sensor.

In another example the sensor 230 comprises a magnetic sensor, configured to sense a magnetic field generated by the card reader within the slot. The magnetic sensor may be in the form of an electronic circuit with a Hall Effect transistor which switch when close enough of a magnetic field-which the card reader is configured to provide (with a permanent magnet or an activated coil for examples).

In another example the sensor 230 comprises an electrical contact which corresponds to an electrical contact of the card reader within the slot. When the contacts are connected the card makes the determination that it is within the first communication zone. The electrical contact in the card is less complex than prior art contact-read contacts in cards. It simply needs to enable the card to know that it is in the right position in a card reader, not transfer data.

Using an electrical contact, a magnetic sensor or a light sensor (or any other sensor that requires close proximity) as the sensor provides an additional layer of security as restricted card reader interactions cannot be activated when situated in a cardholder's pocket, wallet, purse or bag. This, therefore, prevents theft of data or funds through emulating a pseudo-contact mode as it is not possible to activate the card without it being removed from and being inserted into the card reader configured with a trigger for the card sensor (e.g. a corresponding electrical contact, a magnet or an LED).

The card receives power from the electromagnetic field of the card reader. As such the chip and the sensor of the card are only powered when the card is in proximity to the card reader. This type of proximity is enough to power the card in the cardholder wallet or purse with a card reader but not to activate the restricted card reader interactions locked by the card sensor.

There can be also a value in enabling some—but perhaps not all—functionality of the card reader when the card is inserted in the dipping zone even if the card has no sensor to detect it is inserted in the dipping zone.

There can be 3 use cases depending of the activation of the reader switch and the card sensor:

Both the reader and the card detect that the card is in the dipping zone—the card according to the invention fully supports the pseudo-contact mode: long transfer operations are enabled (for example reading encrypted card files, such as a picture to identify the cardholder, fingerprints to be checked on the reader connected to a server) and restricted functionality are enabled (for example verify PIN/biometrics in the card, data and/or security changes) are supported. Legacy cards do not support the pseudo-contact mode of operation and so those cards will not recognize related instructions.

The reader detects the card is in the dipping zone but the card does not—a card according to the invention supports partially (but not completely) the pseudo-contact mode: for example long transfer operations are supported, but restricted or reserved functionality are not. Legacy cards do not support pseudo-contact mode operations.

The reader communicates with the card wirelessly but it is not detected in the dipping zone—in this scenario the pseudo-contact mode is not supported.

It is also worth discussing the cardholder verification that may take place (for example Verify PIN or verify/match biometrics on the card). In a pseudo-contact transaction, this verification allows the transaction to proceed, and other restricted operations are also allowed which are controlled by the cardholder (Change PIN) or by the card issuer (Change Balance). In a contactless transaction, the Verify PIN command is disabled. It is not disabled specifically to prevent high value transactions, but rather to prevent an attacker from trying to guess the PIN of the card while it is still in the cardholder wallet or purse. If an attacker were to succeed in guessing the PIN whilst the card is in a wallet or purse they could then read other card data useful in combination with the PIN, or even attempt to steal the card. If they don't succeed in guessing the PIN the process will lock the card and the cardholder can't use their card anymore (denial of services). Due to the short length of the PIN (4 digits), this kind of in-wallet/purse attack is considered as plausible even if it is essentially academic. The present invention disables some functionality if the operations are not executed in the proper environment. It is not securing the operations as such, more not letting them run at all. For instance, in some embodiments the invention blocks the Verify PIN command, so it blocks the transaction before the PIN has been entered. This means that the cardholder does not find that their card has been blocked because a hacker has incorrectly guessed the PIN too many times whilst it was still in their purse or wallet—the hacker cannot run the verify PIN command at all because the card will not let it run because it does not see the card reader signal at the card's sensor.

Various modifications can be made to the examples described above without departing from the scope of the appended claims. Features of the examples and embodiments may be exchanged, combined, omitted or adapted. The teaching of the specification should be taken as a whole with no limitation placed on scope of the appended claims by reference to the included description and drawings.

The invention claimed is:

1. A card reader device, comprising:
   an antenna for making a wireless connection with a smart card; and
   a card detector, for determining a location of the smart card relative to the antenna; and
   wherein the card reader has a processor configured to provide communication with the smart card and to allow a first wireless communication when the card is determined to be at a first location of the card reader and to provide a second, different, wireless communication when the card is determined to be at a second, different, location of the card reader.

2. A card reader device according to claim 1, further comprising:
   a first communication zone, comprising a card receiving and holding station; and
   a second communication zone, comprising a card contactless station, and wherein the card detector is configured to determine whether the smart card is within the first communication zone or the second communication zone,
   wherein the first and second communication zones comprising the first and second locations of the card reader.

3. A card reader device according to claim 2 wherein the card detector is configured to detect whether the smart card is in the first communication zone or not.

4. A card reader device according to claim 2, wherein the card receiving and holding station is configured to hold the card in a fixed position relative to the antenna, and wherein the card reader is adapted to accommodate cards of different thicknesses and to be able to communicate wirelessly with cards of different thicknesses when they are in the card receiving and holding station.

5. A card reader device according to claim 1, wherein the card detector comprises a switch in the card receiving and holding station, or at the first location of the card reader, and wherein the switch is triggered by insertion of a card into the card receiving and holding station, or by positioning the card at the first location of the card reader.

6. A card reader device according to claim 1, wherein the card reader is configured to provide communication of larger data transfers or longer duration between the card reader and the smart card when the card is in the first communication zone, or at the first location of the card reader, than when it is in the second communication zone, or at the second location of the card reader.

7. A card reader device according to claim 1, wherein the card reader comprises no more than one antenna for communicating with a smart card.

8. A method of communication by a smart card, the method comprising:
   receiving a signal from a card reader;
   determining which one of a number of different wireless communication positions relative to the card reader the card is positioned at, using the received signal;
   determining a wireless communication in dependence on the determined position; and
   receiving the wireless communication from the card reader.

9. A method according to claim 8, wherein the smart card comprises a memory containing a first set of instructions and a second set of instructions, wherein the first set of instructions, when executed, provides a first communication and the second set of instructions, when executed, provides a second communication.

10. A method according to claim 8, the smart card comprising a sensor or electrical contact for receiving the signal from the card reader.

11. The method of claim 10 further comprising:
    enabling a first set of functionalities between the smart card and the card reader upon the determination that the card is in the first communication zone.

12. The method of claim 11 further comprising:
    disabling a second set of functionalities between the smart card and the card reader upon the determination that the card is in the first communication zone.

13. A method of processing a transaction, the method comprising:
    determining a location of a smart card relative to an antenna of a card reader; and
    providing a first wireless communication when the card is determined to be at a first communication zone; and
    providing a second wireless communication when the card is determined to be at a second communication zone.

14. The method of claim 11, wherein the first communication zone includes a card receiving and holding station.

15. The method of claim 14, wherein the second communication zone includes a card contactless station.

* * * * *